United States Patent [19]

Schwab et al.

[11] Patent Number: 5,484,628
[45] Date of Patent: Jan. 16, 1996

[54] PREPARATION OF ACICULAR COBALT-CONTAINING MAGNETIC IRON OXIDE

[75] Inventors: Ekkehard Schwab, Neustadt; Ronald J. Veitch, Maxdorf; Reinhard Körner, Frankenthal; Emil Pfannebecker, Schifferstadt; Bernd Höppner, Neustadt, all of Germany

[73] Assignee: BASF Magnetics GmbH, Mannheim, Germany

[21] Appl. No.: 291,559

[22] Filed: Aug. 16, 1994

[30] Foreign Application Priority Data

Aug. 18, 1993 [DE] Germany ............ 43 27 758.6

[51] Int. Cl.$^6$ .................................................. B05D 7/00
[52] U.S. Cl. .................. 427/215; 427/214; 427/216; 427/127; 427/128; 148/105; 75/349
[58] Field of Search ........................... 427/127, 128, 427/214, 215, 216; 75/349; 148/105

[56] References Cited

U.S. PATENT DOCUMENTS

| | | | |
|---|---|---|---|
| 3,573,980 | 4/1971 | Haller | 427/128 |
| 4,122,216 | 10/1978 | Okazoe | 427/128 |
| 4,770,903 | 9/1988 | Schwab et al. | 427/128 |

FOREIGN PATENT DOCUMENTS

| | | |
|---|---|---|
| 193084 | 3/1986 | European Pat. Off. . |
| 367033 | 10/1993 | European Pat. Off. . |
| 441185 | 6/1976 | United Kingdom . |

Primary Examiner—Shrive Beck
Assistant Examiner—David M. Maiorana
Attorney, Agent, or Firm—Keil & Weinkauf

[57] ABSTRACT

Acicular cobalt-containing magnetic iron oxides having a high coercive force and a core/shell structure and hence low temperature dependence of the coercive force are prepared by a process in which, in a first stage, surface activation is effected by means of iron(II) and cobalt ions under alkaline conditions on the iron oxide core under an inert gas atmosphere and thereafter, in a second stage, an epitactic coating of cobalt ferrite is applied, which coating is formed oxidatively from iron (II) and cobalt (II) hydroxide, likewise under alkaline reaction conditions. The total amount of cobalt ions used for doping remains unchanged compared with the known doped iron oxides or is even smaller. In the second process stage, the achievable coercive force can be controlled by the proportion of air in the gas mixture during the formation of the epitactic coating.

3 Claims, 1 Drawing Sheet

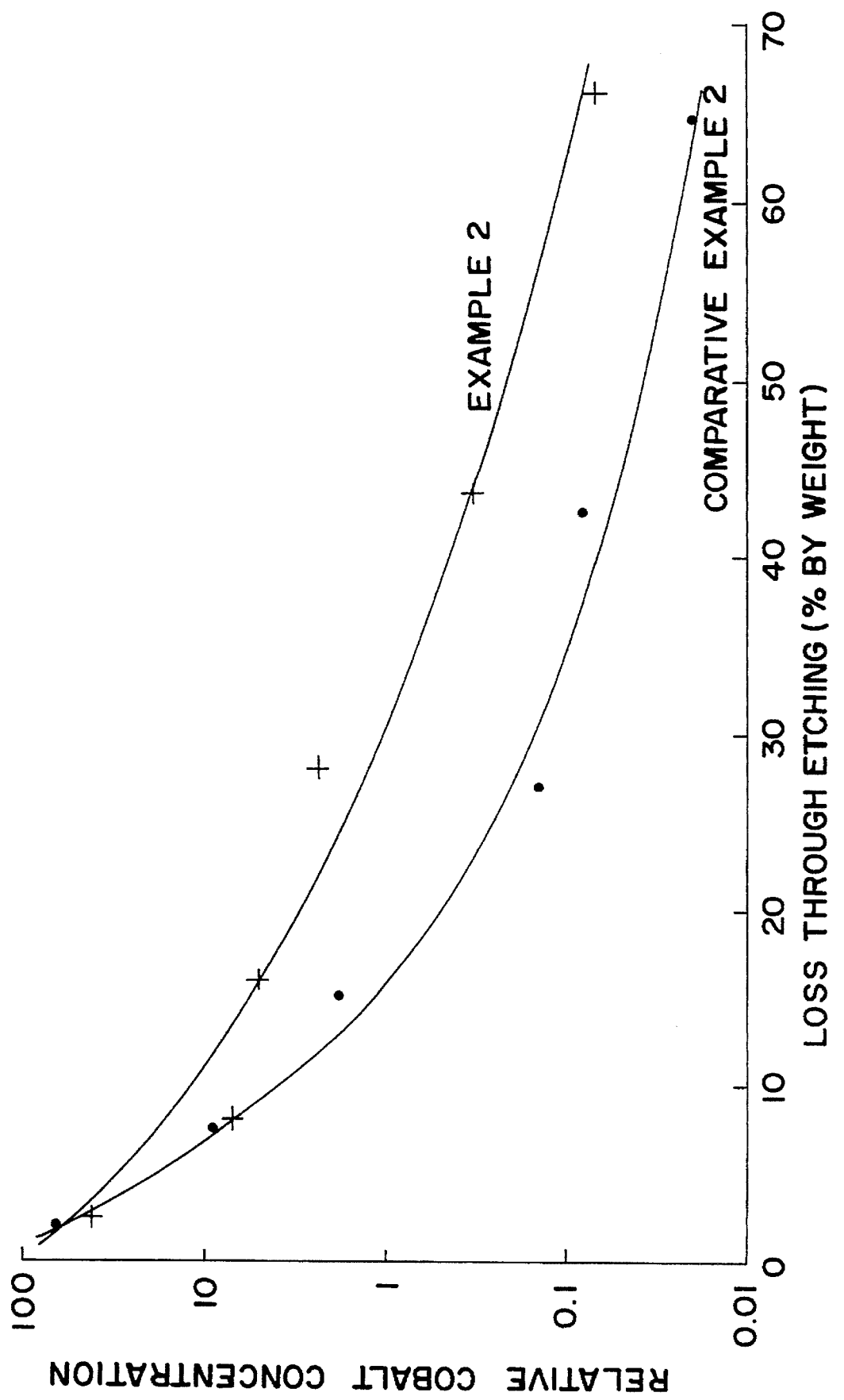

PREPARATION OF ACICULAR COBALT-CONTAINING MAGNETIC IRON OXIDE

The present invention relates to a process for the preparation of acicular magnetic iron oxide having a core/shell structure, the core consisting of an acicular magnetic iron oxide and the shell consisting of a ferrite shell containing cobalt(II) and iron(II) ions, in a first stage, an iron(II) hydroxide precipitate being deposited under an inert gas atmosphere onto the core by precipitation of iron(II) ions by means of alkalis and being reacted under inert gas, in a second stage, an iron(II) and cobalt hydroxide precipitate being deposited on the gamma-iron oxide treated in this manner, by adding a further solution containing iron(II) and cobalt(II) ions, by means of alkalis, and being oxidized by passing a gaseous oxidizing medium into the suspension, and, in a third stage, being converted into the ferrite shell under an inert gas atmosphere, and a cobalt-doped iron oxide having a low temperature dependence resulting from the core/shell structure being obtained.

Cobalt-modified, acicular gamma-iron oxide has long been widely used as magnetizable material in the production of magnetic recording media. With increasing efficiency of the recording systems, the requirements with regard to the magnetizable material have also increased. The industry is very interested in increasing the coercive force without however having to accept substantial deteriorations with regard to the temperature dependence of the magnetic properties.

A precondition for low temperature dependence of the coercive force is a layer-like structure of the pigments, comprising a cobalt-rich surface layer and a cobalt-free or at least low-cobalt pigment core. At the same time, attempts are being made constantly to reduce the volume of the total magnetic particles while retaining the layer-like structure. A number of processes have been proposed for the preparation of this type of pigment.

For example, GB 1 441 185 and U.S. Pat. No. 3,573,980 describe the application of a cobalt-containing compound to the surface of an acicular magnetic iron oxide, which is then heated. The heating step serves for establishing the desired coercive force; by this method, it is difficult to obtain a defined cobalt distribution with a core/shell structure in a reproducible manner.

German Laid-Open Application DOS 2,235,383 discloses the application of a mixture of iron(II) and cobalt(II) hydroxide, which is then oxidized to an epitactic cobalt ferrite layer. In carrying out this process, relatively large amounts of cobalt must be used in order to achieve high coercive forces.

On the other hand, EP-A 0 014 902 and 0 014 903 describe surface coating with iron(II) and cobalt(II) compounds under inert gas conditions.

There is also a plurality of known processes in which the iron and cobalt compounds are applied to the surface of the magnetic iron oxide in more than two steps. A process of the generic type stated at the outset is disclosed in EP 0 246 501, which proposes first carrying out surface activation of the magnetic iron oxide under inert gas by coating with iron(II) hydroxide and then providing an epitactic coating with cobalt ferrite under oxidizing conditions. Coating with three or more layers of cobalt and iron(II) compounds is likewise proposed in EP 0 092 394; all these processes are carried out under inert gas. EP 0 376 033 describes coating initially with a berthollide cobalt-containing compound and then with a cobalt compound.

An investigation, by the Applicant, of the process variants described above has shown that, according to the prior art, either sufficiently high coercive forces are not achievable or large amounts of cobalt must be used for this purpose. On the one hand, this is disadvantageous for economic reasons owing to the high cobalt price; on the other hand, the application of a thick coating to the core leads to undesirably large growth of the particle volume and accordingly to poorer magnetic properties.

It is an object of the present invention to provide a process of the type stated at the outset which provides pigments having a very high coercive force and a core/shell structure comprising undoped and doped parts, without requiring the use of large amounts of cobalt, and which furthermore has very simple process engineering.

It is a further object of the present invention to control the coercive force by specific variation of the process conditions and to avoid the disadvantages of exclusive volume doping with cobalt, for example a pronounced temperature dependence of the coercive force.

SUMMARY OF THE INVENTION

We have found, surprisingly, that the objects are achieved by a process of the generic type stated at the outset, in which cobalt ions have already been added in the first stage, and the addition of cobalt in the second stage can be reduced so that the total amount of cobalt ions used for doping can be left unchanged compared with the prior art or even reduced. The addition, in the third stage, of an aging stage under an inert gas atmosphere at elevated temperatures, preferably above 60° C., is advantageous for the magnetic properties of the products prepared by the novel process.

The procedure described gives products having high coercive forces without a thicker coating having to be applied to the shell for this purpose. The effect is due to the fact that, in the novel process, a cobalt profile which combines elements of slight volume doping and epitactic surface coating is established in a specific and reproducible manner and the disadvantages of exclusive volume doping, i.e. a pronounced temperature dependence of the coercive force, as stated above, are thus avoided. However, the process may also be used for obtaining a certain coercive force by means of a reduced amount of cobalt and hence in a particularly economical manner.

BRIEF DESCRIPTION OF THE DRAWING

The Figure is a representation of the cobalt profiles of a sample prepared according to the invention and a sample prepared by a comparative method.

DETAILED DESCRIPTION OF THE INVENTION

The division of the total amount of cobalt used for doping between process stages 1 and 2 may be varied; division in the ratio of about 1:4 to 1:2 between activation stage 1 and epitactic coating 2 has proven particularly advantageous. Particularly good results are also obtained when the reaction temperature in process stage 3 is kept at from 30° to 60° C.; however, temperatures outside this range are also possible. Finally, in the third process stage, the achievable coercive force can be controlled, as is evident from the Examples below, by means of the proportion of air in the gas mixture, i.e., for example, by the ratio of oxygen to inert gas, during the formation of the epitactic coating.

The novel process may be advantageously combined with the processes for stabilization of aging, which processes are disclosed, for example, in DE-A 39 12 976 or German Application P 43 20 985.

Gamma-$Fe_2O_3$, $Fe_3O_4$ and berthollide iron oxides having a composition $FeO_x$, where $1.33<x<1.5$, may be used as magnetic iron oxide core material. These may contain the dopants usually used in magnetic iron oxides. Examples of suitable iron(II) and cobalt salts are chlorides or sulfates, and the bases used are the conventional compounds, such as sodium hydroxide solution or potassium hydroxide solution. Air, air/nitrogen mixtures or oxygen/air mixtures may be used as the oxidizing gas. Nonoxidizing gases, for example nitrogen or argon, are suitable for producing an inert gas atmosphere.

The Examples and Comparative Examples which follow illustrate the invention without restricting it.

EXAMPLE 1

75 g of a magnetic iron oxide having a specific surface area of 31.4 $m^2/g$, a coercive force of 23.0 kA/m and an $Fe^{2+}$ content of 13.9% by weight were dispersed in 330 ml of $H_2O$ by means of a conventional dispersing apparatus based on the rotor/stator principle. The dispersion was blanketed with an inert atmosphere by passing in nitrogen, and 80 ml of 50% strength NaOH were added. Thereafter, first 1.79 g of $CoSO_4.7H_2O$ and then 14.93 g of $FeSO_4.7H_2O$ were added and the dispersion was kept at 50° C. for one hour under nitrogen. It was then cooled to 35° C. and, after this temperature had been reached, first 18.87 g of $FeSO_4.7H_2O$ and then a further 8.94 g of $CoSO_4.7H_2O$ were added. This coating was then converted into cobalt ferrite in the course of two hours at room temperature by passing in a gas mixture comprising air and nitrogen in a ratio of 1:10. The dispersion was then aged for one hour at 80° C. under nitrogen.

It was filtered in a conventional manner and washed with $H_2O$. The product obtained was dried under nitrogen at not more than 110° C.

Comparative Example 1

The process according to Example 1 was repeated, except that no $CoSO_4$ was added in the first process stage and instead 14.3 g of $CoSO_4.7H_2O$ were used in the second process stage.

EXAMPLE 2

65 g of a gamma-iron oxide having a specific surface area of 47.7 $m^2/g$ and a coercive force of 24.3 kA/m were dispersed in 244 ml of $H_2O$, and 156 ml of 50% strength by weight NaOH were added. This reaction batch was heated to 60° C. under nitrogen and, after this temperature had been reached, first 4.64 g of $CoSO_4.7H_2O$ and then 12.94 g of $FeSO_47H_2O$, each dissolved in $H_2O$, were added; the dispersion was kept under these conditions for one hour. It was then cooled to 35° C. and, after this temperature had been reached, first a further 7.75 g of $COSO_4.7H_2O$ and then 25.88 g of $FeSO_4.7H_2O$, dissolved in $H_2O$, were added. Thereafter, gassing was changed over to an air/nitrogen mixture of 1:10, and the dispersion was oxidized for four hours. Finally, the total batch was aged for one hour at 80° C. under nitrogen. The product obtained was after treated as in Example 1.

Comparative Example 2

(corresponds to the process disclosed in EP 0 246 501)

950 g of the same gamma-iron oxide as in Example 2 were dispersed in 5.8 l of $H_2O$, and 2.3 l of concentrated NaOH were added. The dispersion obtained was heated to 50° C. under nitrogen and, after this temperature had been reached, 189.1 g of $FeSO_4.7H_2O$, dissolved in $H_2O$, were added. The batch was kept under these conditions for one hour with vigorous stirring. It was then cooled to 30° C. and, after this temperature had been reached, first 378.3 g of $FeSO_4.7H_2O$ and then 181.3 g of $CoSO_4.7H_2O$, each dissolved in $H_2O$, were added with further vigorous stirring. The dispersion was then gassed for 7 hours with air and then aged for a further hour under nitrogen at 80° C. The product obtained was aftertreated as described in the previous Examples.

EXAMPLE 3

The procedure was as in Example 2, except that the first process stage was carried out at 50° C. and that the oxidation in the second process stage was effected for 30 minutes by passing in pure air.

EXAMPLE 4

The procedure was as in Example 3, except that, in the second process stage, the oxidation was carried out with an air/nitrogen mixture in a ratio of 1:20 for seven hours.

To characterize the properties of the products obtained by the novel process or according to the Comparative Examples, the following test methods were used: Determination of the magnetic properties using a vibrating sample magnetometer at a maximum field strength of 380 kA/m; the values of the coercive force are converted to a packing density of the sample of 1.2 $g/cm^3$. Determination of the specific surface area SSA using a Ströhlein areameter by the BET one-point method according to Haul and Dümbgen. Determination of the chemical composition of the samples by the usual analytical methods. Analysis of the cobalt distribution by the etching method described in the stated EP 0 246 501. The pigment is treated with acids of increasing concentration for a certain time in order to dissolve away increasing amounts of the pigment particles. The amount of pigment remaining behind in each case is subjected to a chemical analysis. From these analytical data, concentration depth profiles for the individual elements can be calculated using the following equation:

$$\% X = \frac{(\text{Amount } X)_n - (\text{Amount } X)_{n+1}}{(\text{Loss})_{n+1} - (\text{Loss})_n} \times 100$$

where the loss is the total loss of dissolved pigment and the amount X is the mass of the element X still present in the residue.

The Figure shows the resulting cobalt profile of a sample which was prepared according to Example 2 or Comparative Example 2. The comparison shows that the sample prepared according to Example 2 has a slightly less pronounced core/shell structure than the sample prepared according to Comparative Example 2, ie. the novel process goes a little further in the direction of volume doping without having the disadvantages thereof, as mentioned above.

TABLE

| Example | $H_c$ (kA/m) | $M_m/\rho$ (nTm³/g) | SSA (m²/g) | Fe (II) (% by wt.) | Co (% by wt.) |
|---|---|---|---|---|---|
| 1 | 52.5 | 98.6 | 33.7 | 12.1 | 2.9 |
| Comp. Example 1 | 50.7 | 96.4 | 33.7 | 12.4 | 3.5 |
| 2 | 65.9 | 93.9 | 39.6 | 3.3 | 3.5 |
| Comp. Example 2 | 56.1 | 92.0 | 39.7 | 2.6 | 3.4 |
| 3 | 58.7 | 96.2 | 44.4 | 2.1 | 3.4 |
| 4 | 63.5 | 94.2 | 41.5 | 3.2 | 3.4 |

We claim:

1. A process for the preparation of acicular magnetic iron oxide having a core/shell structure, consisting of a core of iron oxide and a ferrite shell containing cobalt (II) and iron(II) ions, which process comprises: in a first stage, depositing an iron(II) and cobalt hydroxide precipitate under an inert gas atmosphere on a suspension of acicular magnetic iron oxide by precipitation of iron(II) and cobalt(II) ions under alkaline conditions, and then in a second stage, depositing an iron(II) and cobalt hydroxide precipitate on the gamma-iron oxide treated in the first stage, by adding a further solution containing iron(II) and cobalt(II) ions to the suspension, under alkaline conditions, while passing a gaseous oxidizing medium into the suspension, and, in a third stage, converting the shell into a ferrite structure under an inert gas atmosphere, wherein surface activation of iron(II) and cobalt(II) ions under alkaline conditions is carried out in both the first stage and the second stage and the amount of cobalt is divided between process stages 1 and 2.

2. The process as defined in claim 1, wherein the ratio of the amounts of cobalt which are added during stage 1 and stage 2 is from 1:4 to 1:2.

3. The process as defined in claim 1, wherein, in the second process stage, the coercive force is controlled by the ratio of oxygen to inert gas in the gas mixture during the formation of the shell.

* * * * *